US008419990B2

(12) United States Patent
Han et al.

(10) Patent No.: US 8,419,990 B2
(45) Date of Patent: Apr. 16, 2013

(54) PROCESS OF MAKING AROMATIC POLYAMIDE FILAMENT

(75) Inventors: In-Sik Han, Daegu (KR); Jae-Young Lee, Daegu (KR); Jae-Young Kim, Gumi-si (KR); Tae-Hak Park, Gumi-si (KR); So-Yeon Kwon, Busan (KR)

(73) Assignee: Kolon Industries, Inc., Kwacheon-si (KR)

( * ) Notice: Subject to any disclaimer, the term of this patent is extended or adjusted under 35 U.S.C. 154(b) by 556 days.

(21) Appl. No.: 12/792,304

(22) Filed: Jun. 2, 2010

(65) Prior Publication Data
US 2010/0237532 A1 Sep. 23, 2010

Related U.S. Application Data

(62) Division of application No. 11/994,642, filed as application No. PCT/KR2006/002627 on Jul. 5, 2006, now Pat. No. 7,776,439.

(30) Foreign Application Priority Data

Jul. 6, 2005 (KR) .................. 10-2005-0060501

(51) Int. Cl.
*B01F 7/16* (2006.01)
*C08F 2/06* (2006.01)
*C08G 69/26* (2006.01)
*D01D 5/06* (2006.01)
*D01F 6/60* (2006.01)

(52) U.S. Cl.
USPC .............. 264/184; 366/98; 526/62; 528/341

(58) Field of Classification Search .................. 264/184; 366/96, 97, 98; 526/62; 528/332, 335, 341
See application file for complete search history.

(56) References Cited

U.S. PATENT DOCUMENTS

| 3,869,429 A | 3/1975 | Blades |
| 3,869,430 A | 3/1975 | Blades |
| 4,885,356 A | 12/1989 | Milligan et al. |
| 6,592,987 B1 | 7/2003 | Sakamoto et al. |

FOREIGN PATENT DOCUMENTS

| JP | 2001-303365 A | 10/2001 |
| KR | 1996-17943 A | 6/1996 |

*Primary Examiner* — Leo B Tentoni
(74) *Attorney, Agent, or Firm* — Birch, Stewart, Kolasch & Birch, LLP

(57) ABSTRACT

Disclosed are wholly aromatic polyamide filament and a method of manufacturing the same, characterized in that, in the process of preparing the wholly aromatic polyamide polymer, the aromatic diamine, aromatic diacid chloride and polymerization solvent put into the reactor 20 are agitated by an agitation device which is installed in the reactor 20 and consists of: (i) a rotor 3 driven by a motor 2 and having a plurality of pins 3*a*; and (ii) a stator 4 having a plurality of pins 4*a*, wherein spin speed of the rotor 3 is controlled to 10 to 100 times of both of feeding rates for the aromatic diacid chloride and the aromatic diamine in the polymerization solvent into the reactor and, at the same time, contact frequency between the pins 3*a* and the pins 4*a* is regulated within a range of 100 to 1,000 Hz. The present invention is effective to progress uniform and homogeneous polymerization over all of area of a polymerization reactor 20, thereby reducing deviation in degree of polymerization, since polymeric monomers are miscible and react together very well in the reactor 20. Accordingly, the wholly aromatic polyamide filament produced exhibits narrow PDI and lowered paracrystalline parameter $g_{II}$ leading to reduction of defects of a crystal itself, so as to considerably improve strength and modulus thereof.

4 Claims, 2 Drawing Sheets

PROCESS OF MAKING AROMATIC POLYAMIDE FILAMENT

CROSS REFERENCE TO RELATED APPLICATIONS

This application is a Divisional of application Ser. No. 11/994,642 filed on Jan. 3, 2008, now U.S. Pat. No. 7,776,439 B2, application Ser. No. 11/994,642 is a 371 of PCT/KR2006/002627 filed Jul. 5, 2006, and which claims priority to Application No. 10-2005-0060501 filed in the Republic of Korea, on Jul. 6, 2005. The entire contents of all of the above applications are hereby incorporated by reference.

TECHNICAL FIELD

The present invention relates to wholly aromatic polyamide filament and a method of manufacturing the same, and more particularly, to a method of manufacturing novel wholly aromatic polyamide filament with physical properties including high strength and modulus.

BACKGROUND ART

As disclosed in early known arts, for example, U.S. Pat. Nos. 3,869,429 and 3,869,430, wholly aromatic polyamide filaments are manufactured by a series of processes including: a process of preparing wholly aromatic polyamide polymer by polymerizing aromatic diamine and aromatic diacid chloride in a polymerization solvent containing N-methyl-2-pyrrolidone; a process of preparing a spinning liquid dope by dissolving the prepared polyamide polymer in a concentrated sulfuric acid solvent; a process of forming filaments by extruding the spinning liquid dope through spinnerets and passing the spun material through a non-coagulation fluid layer into a coagulant tank; and a process of refining the resulting filaments by washing, drying and heat treatment processes.

FIG. 1 is a schematic view illustrating a process of manufacturing wholly aromatic polyamide filament by conventional dry-wet spinning process.

As to a conventional process of manufacturing wholly aromatic polyamide filament, there is a problem that polymeric monomers put into a polymerization reactor 20 do not mingle together very well, thus, are not polymerized uniformly or homogeneously over all of area of the reactor 20.

For that reason, the conventional process has a disadvantage of increasing deviation in degree of polymerization for wholly aromatic polyamide polymer, thereby causing a problem that physical properties, especially, strength and modulus of wholly aromatic polyamide filament are deteriorated.

As a result of intensive study and investigation made by the present inventor in order to solve the foregoing problem, the present invention has been suggested to produce novel wholly aromatic polyamide filament with improved strength and modulus.

DISCLOSURE OF THE INVENTION

Technical Problem

Therefore, an object of the present invention is to improve strength and modulus of wholly aromatic polyamide filament as a final product by enabling uniform and homogeneous polymerization of monomer over all of area of a polymerization reactor 20, thus, minimizing deviation in degree of polymerization (hereinafter abbreviated to "deviation") of the resulting polymer.

Another object of the present invention is to provide wholly aromatic polyamide filament with narrow distribution of molecular weight of the filament called to Polydispersity Index (referred to as "PDI") and reduced paracrystalline parameter (referred to as "$g_{II}$"), which represents defects of a crystal itself, resulting from minimum deviation of the polymer, so that the filament has improved strength and modulus.

Technical Means to Solve the Problem

In order to achieve the above objects, the present invention provides a process of manufacturing wholly aromatic polyamide filament, comprising: dissolving wholly aromatic polyamide polymer in a concentrated sulfuric acid solvent to prepare a spinning liquid dope, wherein the wholly aromatic polyamide polymer is obtained by polymerizing aromatic diamine and aromatic diacid chloride in a polymerization solvent containing N-methyl-2-pyrrolidone; and spinning the spinning liquid dope through spinnerets to give a spun material, characterized in that, in the process of preparing the wholly aromatic polyamide polymer, the aromatic diamine, aromatic diacid chloride and polymerization solvent put into the reactor 20 are agitated by an agitation device which is installed in the reactor 20 and consists of: (i) a rotor 3 driven by a motor 2 and having a plurality of pins 3a; and (ii) a stator 4 having a plurality of pins 4a, wherein spin speed of the rotor 3 is controlled to 10 to 100 times of both of feeding rates for the aromatic diacid chloride and the aromatic diamine in the polymerization solvent into the reactor and, at the same time, contact frequency between the pins 3a and the pins 4a is regulated within a range of 100 to 1,000 Hz.

The wholly aromatic polyamide filament of the present invention is characterized in that PDI ranges from 1.5 to 2.3 and paracrystalline parameter $g_{II}$ before heat treatment ranges from 1.7 to 1.9%.

Hereinafter, the present invention will be described in detail with reference to the accompanying drawings.

Firstly, according to the present invention, wholly aromatic polyamide polymer is prepared by polymerizing aromatic diamine and aromatic diacid chloride in a polymerization solvent containing N-methyl-2-pyrrolidone.

The aromatic diamine preferably comprises p-phenylenediamine and the aromatic diacid chloride preferably comprises terephthaloyl chloride.

Also, the polymerization solvent preferably comprises N-methyl-2-pyrrolidone containing dissolved calcium chloride.

As to the process of preparing the wholly aromatic polyamide polymer according to the present invention as described above, aromatic diamine, aromatic diacid chloride and a polymerization solvent put into a polymerization reactor 20 are agitated by an agitation device as illustrated in FIG. 2, which is installed in the reactor 20 and consists of: (i) a rotor 3 driven by a motor 2 and having a plurality of pins 3a; and (ii) a stator 4 having a plurality of pins 4a, wherein spin speed of the rotor 3 is controlled to 10 to 100 times of both of feeding rates for the aromatic diacid chloride and the aromatic diamine in the polymerization solvent into the reactor and, at the same time, contact frequency between the pins 3a and the pins 4a is regulated within a range of 100 to 1,000 Hz.

FIG. 2 is a schematic cross-sectional view illustrating a polymerization reactor 20 used in the present invention.

More particularly referring to FIG. 2, the inventive reactor 20 is equipped with an agitation device that consists of a rotor 3 driven by a motor 2 and having a plurality of pins 3a, and a stator 4 having a plurality of pins 4a.

The present invention progresses polymerization of polymeric monomers and polymerization solvent fed into the reactor under agitating.

Herein, the agitation device is preferably operated by controlling spin speed of the rotor 3 to a value ranging from 10 to 100 times of feeding rates for the aromatic diacid chloride and the aromatic diamine in the polymerization solvent into the reactor 20 and, at the same time, regulating contact frequency between the pins 3a and the pins 4a within a range of 100 to 1,000 Hz.

If the spin speed of the rotor 3 is below 10 times of the feeding rate for the polymeric monomer or the contact frequency between the pins 3a and the pins 4a (abbreviated to "contact frequency") is below 100 Hz, all of the polymeric monomers and the polymerization solvent are agitated not enough to achieve a homogeneous polymerization over all of area of the reactor.

Otherwise, when the spin speed of the rotor 3 exceeds 100 times of the feeding rate for the polymeric monomer or the contact frequency is above 1,000 Hz, it may generate excessive shear rate applied to inside of the reactor to leading to uneven polymerization.

The wholly aromatic polyamide polymer has intrinsic viscosity of not less than 5.0, which is preferable for improving the strength and modulus of the filament.

Conditions of polymerization for the above polymer are substantially same as those previously known, for example, in U.S. Pat. No. 3,869,429 or the like.

A preferred embodiment of the process for preparing the above polymer provides microfine powder form of polymer by introducing a solution which is obtained by dissolving 1 mole of p-phenylenediamine in N-methyl-2-pyrrolidone containing above 1 mole of calcium chloride, and 1 mole of terephthaloyl chloride into the polymerization reactor 20 equipped with the agitation device as shown in FIG. 2; agitating the mixture in the reactor to form a gel type of polymer; and crushing, washing and drying the gel type polymer, thereby resulting in the polymer in the microfine powder form. The terephthaloyl chloride may be introduced into the reactor 20 in halves and/or by two steps.

Next, the wholly aromatic polyamide polymer prepared as described above is dissolved in a concentrated sulfuric acid solvent to form a spinning liquid dope. Then, as shown in FIG. 1, the spinning liquid dope is submitted to a spinning process through a spinneret 40 to form spun material, followed by passing the spun material through a non-coagulation fluid layer into a coagulant tank 50 to form filaments. In the end, wholly aromatic polyamide filament according to the present invention is produced by washing, drying and heat treatment processes for the resulting filament. FIG. 1 is a schematic view illustrating a process of manufacturing wholly aromatic polyamide filament by a dry-wet spinning process.

The concentrated sulfuric acid used in production of the spinning liquid dope preferably has a concentration ranging from 97 to 100% and may be replaced by chlorosulfuric acid or fluorosulfuric acid.

If the concentration of the sulfuric acid is below 97%, solubility of the polymer is lowered and non-isotropic solution cannot easily express liquid crystallinity. Therefore, it is difficult to obtain the spinning liquid dope with a constant viscosity, and in turn, to manage the spinning process, thus causing mechanical properties of a final textile product to be deteriorated.

Otherwise, when the concentration of the concentrated sulfuric acid exceeds 100%, $SO_3$ content becomes excessive in any fumed sulfuric acid containing over-dissociated $SO_3$, thus, it is undesirable to handle and use the sulfuric acid as the spinning liquid dope because it causes partial dissolution of the polymer. In addition, even if the fiber is obtained by using the spinning liquid dope, it has loose inner structure, is substantially lusterless in terms of appearance and decreases diffusion rate of the sulfuric acid into the coagulant solution, so that it may cause a problem of lowering mechanical properties of the fiber.

Alternatively, the concentration of polymer in the spinning liquid dope preferably ranges from 10 to 25% by weight.

However, both of the concentration of the concentrated sulfuric acid and the concentration of the polymer in the spinning liquid dope are not particularly limited.

The non-coagulation fluid layer may generally comprise an air layer or an inert gas layer.

Depth of the non-coagulation fluid layer, that is, a distance from the bottom of the spinneret 40 to the surface of the coagulant in the coagulant tank 50 preferably ranges from 0.1 to 15 cm, in order to improve spinning ability or physical properties of the filament.

The coagulant contained in the coagulant tank 50 may overflow and include but be not limited to, for example, water, saline or aqueous sulfuric acid solution with below 70% of concentration.

Subsequently, the formed filament is subject to washing, drying and heat treatment to manufacture wholly aromatic polyamide. The spinning and take-up velocity ranges from 700 to 1,500 m/min.

The resulting wholly aromatic polyamide according to the present invention has minimum deviation, thus, exhibits narrow PDI and reduced paracrystalline parameter $g_{II}$, which represents defects of a crystal itself, so that it has excellent strength before and after the heat treatment of not less than 26 g/d, and excellent modulus before the heat treatment of not less than 750 g/d and after the heat treatment of not less than 950 g/d.

More particularly, the wholly aromatic polyamide filament according to the present invention has PDI ranging from 1.5 to 2.3, preferably, 1.5 to 2.0, and more preferably, 1.5 to 1.7, and the paracrystalline parameter $G_{II}$ before the heat treatment ranging from 1.7 to 1.9%. Also, the paracrystalline parameter $g_{II}$ after the heat treatment at 300° C. under 2% tension for 2 seconds ranges from 1.3 to 1.6%.

In case that PDI and the paracrystalline parameter $g_{II}$ exceed the above ranges, it shows insignificant increase of the modulus. On the contrary, PDI and the paracrystalline parameter $g_{II}$ are less than the above ranges, although the modulus increases it is within an area which is difficult to be achieved by the present invention.

Accordingly, compared with conventional wholly aromatic polyamide filament, the wholly aromatic polyamide filament of the present invention has deviation in degree of polymerization of the polymer, thus, exhibits narrow PDI and lower paracrystalline parameter $g_{II}$ which represents defects of a crystal itself.

As a result, the wholly aromatic polyamide exhibits excellent strength and remarkably improved modulus.

Advantageous Effects

As described above, the present invention enables deviation in degree of polymerization to be minimum by uniformly progressing polymerization of polymeric monomer over all of area of a polymerization reactor 20.

Accordingly, the wholly aromatic polyamide filament manufactured by the present invention has minimum deviation in degree of polymerization of the polymer, thus, represents narrow PDI and lower paracrystalline parameter $g_{II}$, thereby reducing defects of a crystal itself, so that it exhibits excellent strength and remarkably improved modulus.

BRIEF DESCRIPTION OF THE DRAWINGS

The above object, features and advantages of the present invention will become more apparent to those skilled in the related art from the following preferred embodiments of the invention in conjunction with the accompanying drawing.

Figure 1:
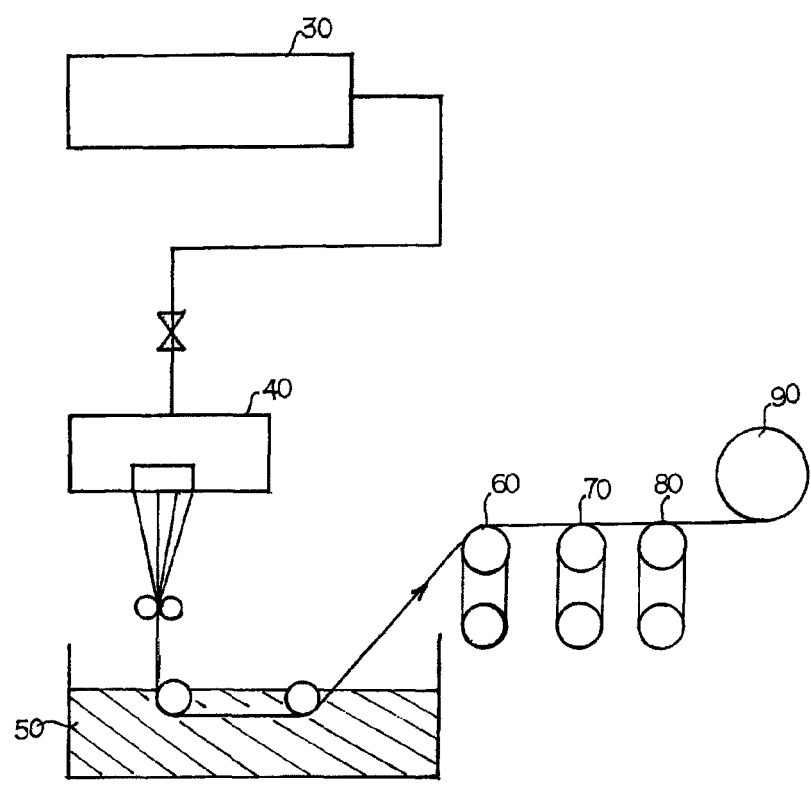
FIG. 1 is a schematic view illustrating a process of manufacturing wholly aromatic polyamide filament by conventional dry-wet spinning process.

*Explanation of Reference Numerals of Main Parts of the Drawings

| | |
|---|---|
| 2: motor | 3: rotor |
| 3a: pin fixed in rotor | 4: stator |
| 4a: pin fixed in stator | 20: polymerization reactor |
| 21: inlet for feeding monomer and polymerization solvent | |
| 22: outlet for polymer | |
| 30: spinning liquid dope storage tank | |
| 40: spinneret | 50: coagulant tank |
| 60: washing device | 70: dryer |
| 80: heat treatment device | 90: winder |

BEST MODE FOR CARRYING OUT THE INVENTION

Features of the present invention described above and other advantages will be more clearly understood by the following non-limited examples and comparative examples. However, it will be obvious to those skilled in the art that the present invention is not restricted to the specific matters stated in the examples below.

EXAMPLE 1

1,000 kg of N-methyl-2-pyrrolidone was maintained at 80° C. and combined with 80 kg of calcium chloride and 48.67 kg of p-phenylenediamine which was then dissolved to prepare an aromatic diamine solution.

After putting the aromatic diamine solution and fused terephthaloyl chloride in a molar quantity equal to p-phenylenediamine simultaneously into a polymerization reactor 20 equipped with an agitation device which is installed in the reactor 20 and consists of a rotor 3 having a plurality of pins 3a and a stator 4 having a plurality of pins 4a, both of these compounds were agitated and became poly (p-phenylene terephthalamide) polymer with intrinsic viscosity of 7.0.

Herein, the spin speed of the rotor 3 was controlled to about 30 times of the feeding rate of polymeric monomer while the contact frequency between the pins 3a and the pins 4a was regulated to about 500 Hz.

Continuously, the obtained polymer was dissolved in 99% concentrated sulfuric acid to form an optical non-isotropic liquid dope for spinning with 18% of polymer content.

The formed liquid dope was spun through the spinneret 40 as shown in FIG. 1 to form spun material. After passing the spun material through an air layer with thickness of 7 mm, it was fed into a coagulant tank 50 containing water as the coagulant, thereby forming filament.

After that, to the formed filament, water was injected at 25° C. to rinse the filament, followed by passing the filament through a double-stage dry roller having the surface temperature of 150° C. and winding the rolled filament to result in poly (p-phenylene terephthalamide) filament before heat treatment.

Various physical properties of the produced poly (p-phenylene terephthalamide) filament were determined and the results are shown in the following Table 1.

EXAMPLE 2

The poly (p-phenylene terephthalamide) filament resulting from Example 1 was subject to heat treatment at 300° C. under 2% tension for 2 seconds to yield a final product, that is, poly (p-phenylene terephthalamide) filament after heat treatment.

Various physical properties of the produced poly (p-phenylene terephthalamide) filament were determined and the results are shown in the following Table 1.

Comparative Example 1

Figure 2:
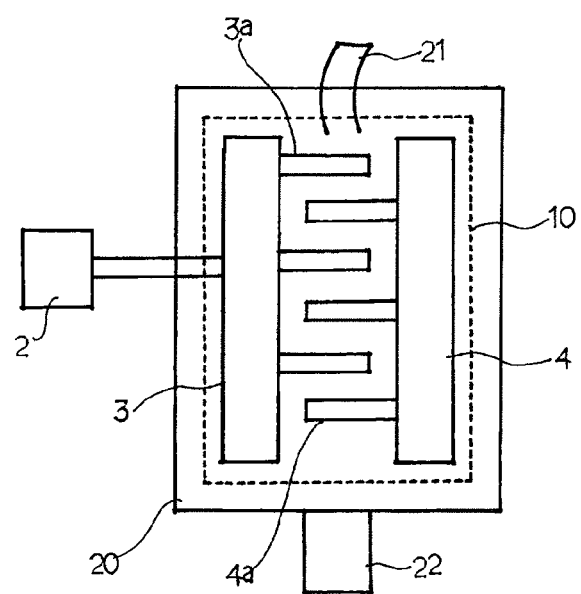
FIG. 2 is a schematic cross-sectional view illustrating a polymerization reactor 20 used in the present invention.

The production of poly (p-phenylene terephthalamide) filament before heat treatment was carried out in the same procedure and under similar conditions as Example 1 except that the aromatic diamine solution B and the fused terephthaloyl chloride prepared in Example 1 were fed into a conventional polymerization reactor equipped with only a screw instead of the agitation device illustrated in FIG. 2.

Various physical properties of the produced poly (p-phenylene terephthalamide) filament were determined and the results are shown in the following Table 1.

Comparative Example 2

The poly (p-phenylene terephthalamide) filament resulting from Comparative Example 1 was subject to heat treatment at 300° C. under 2% tension for 2 seconds to yield a final product, that is, poly (p-phenylene terephthalamide) filament after heat treatment.

Various physical properties of the produced poly (p-phenylene terephthalamide) filament were determined and the results are shown in the following Table 1.

TABLE 1

Evaluation results of physical properties of filament

| Section | | Example 1 | Example 2 | Comparative example 1 | Comparative example 2 |
|---|---|---|---|---|---|
| Polydispersity index (PDI) | | 1.6 | 1.5 | 2.7 | 2.6 |
| Paracrystalline parameter($g_{II}$) | Before heat treatment | 1.80% | — | 1.66% | — |

TABLE 1-continued

Evaluation results of physical properties of filament

| Section | Example 1 | Example 2 | Comparative example 1 | Comparative example 2 |
|---|---|---|---|---|
| After heat treatment at 300° C. under 2% tensile for 2 seconds | — | 1.56% | — | 1.91% |
| Strength (g/d) | 27 | 26 | 22 | 21 |
| Modulus (g/d) | 840 | 1,080 | 740 | 930 |

The foregoing listed physical properties of the filament according to the present invention were determined and/or evaluated by the following procedures:

Strength (g/d):

After measuring force g at break point of a sample yarn by means of Instron tester which is available from Instron Engineering Corp., Canton, Mass., using the sample yarn with 25 cm of length, the measured value was divided by denier number of the sample yarn to give the strength. Such strength is the average calculated from values yielded by testing the sample yarns five times. In this examination, the tension velocity was defined as 300 mm/min and the initial-load was defined as fineness×1/30 g.

Modulus (g/d):

Under the same conditions as with the strength, a stress-strain curve for the sample yarn was obtained. The modulus was determined from a slope of the stress-strain curve.

Intrinsic Viscosity:

A sample solution was prepared by dissolving 0.1250 g of a sample, that is, polymer or filament in 25.0 ml of 98% sulfuric acid as a solvent. Then, after measuring flow time (fluid falling time by seconds) of each of the sample solution and the solvent (that is, sulfuric acid) in a water tank with constant temperature of 30° C. by using a capillary viscometer called Cannon Fenske Viscometer Type 300, a relative viscosity ηrel was calculated by dividing the flow time of the sample solution by the flow time of the solvent. The calculated viscosity ηrel was divided by the concentration of the sample solution to yield the intrinsic viscosity.

Polydispersity Index PDI:

Using Gel Permeation Chromatography (referred to as "GPC"), PDI was determined by the following procedures:

(i) Synthesis of Wholly Aromatic Polyamide Polymer Derivative

Wholly aromatic polyamide filament as a sample and potassium ter-butoxide were added to dimethyl sulfoxide and dissolved at room temperature under nitrogen atmosphere. Then, to the solution, added was allyl bromide to produce wholly polyamide polymer substituted by allyl group (see Macromolecules 2000, 33, 4390).

(ii) Determination of PDI

The produced wholly polyamide polymer was dissolved in $CHCl_3$ and submitted to determination of PDI by using Shodex GPC of Waters manual injector kit at 35° C. and a flow rate of 10 ml/min, which is equipped with a refraction index detector.

Paracrystalline Parameter $g_{II}$:

Using XRD and Hosemann diffraction theory based on unit-cell area, paracrystalline parameter $g_{II}$ was determined by the following procedures:

(i) Sampling

Wholly aromatic polyamide filament samples having a thickness of about 1,000 to 2,000 deniers were aligned as regularly as possible, and then fixed to a sample holder with a length of 2 to 3 cm.

(ii) Measurement Order

After fixing the prepared sample on a sample attachment, β-position is set up to 0° (the sample is fixed on the sample attachment in an axial direction of the filament to set up β-position).

XRD equipment is ready to measure the crystallinity X by gently raising electric voltage and current up to 50 kV and 180 mA, respectively, after warming-up the equipment.

Meridional pattern capable of calculating paracrystalline parameter $g_{II}$ is measured.

Set up are the following measurement conditions in principle:

Goniometer, continuous scan mode, scan angle range of 10 to 40°, and scan speed of 0.5. [since the peak intensity is very small, given is a beam exposure time with step/scan time sufficient to increase the peak intensity up to 2,000 CPS]

Measured is 2θ position of a peak (200 plane) appearing between 10 and 15° of a profile in which the scanning was carried out.

The measured profile is applied in the following Hosemann equation to deduce the paracrystalline parameter $g_{II}$:

$$(\delta_S)_0^2 = (\delta_S)_c^2 + (\delta_S)_{II}^2 = \frac{1}{L_{wd}^2} + \frac{(\pi g_{II})^4 m^4}{d_{wd}^2}$$

wherein $\delta_s$ means dispersion degree of diffraction peak, L is crystal size, d is spacing of lattice face, and m means order of diffraction peak.

INDUSTRIAL APPLICABILITY

As described above, the present invention is effective to manufacture wholly aromatic polyamide filament with excellent strength and modulus.

What is claimed is:

1. A method of manufacturing wholly aromatic polyamide filament, comprising: dissolving wholly aromatic polyamide polymer in a concentrated sulfuric acid solvent to prepare a spinning liquid dope, wherein the wholly aromatic polyamide polymer is obtained by polymerizing aromatic diamine and aromatic diacid chloride in a polymerization solvent containing N-methyl-2-pyrrolidone; and spinning the liquid dope through spinnerets to give a spun material, characterized in that, in the process of preparing the wholly aromatic polyamide polymer, the aromatic diamine, aromatic diacid chlroide and polymerization solvent put into the reactor 20 are agitated by an agitation device which is installed in the reactor 20 and consists of: (i) a rotor 3 driven by a motor 2 and having a plurality of pins 3*a*; and (ii) a stator 4 having a plurality of pins 4*a*, wherein spin speed of the rotor 3 is controlled to 10 to 100 times of both of feeding rates for the aromatic diacid chloride and the aromatic diamine in the polymerization solvent into the reactor and, at the same time, contact frequency between the pins 3*a* and the pins 4*a* is regulated within a range of 100 to 1,000 Hz.

2. The method according to claim 1, wherein the polymerization solvent contains calcium chloride.

3. The method according to claim 1, wherein the aromatic diamine comprises p-phenylenediamine.

4. The method according to claim 1, wherein the aromatic diacid chloride comprises terephthaloyl chloride.

\* \* \* \* \*